United States Patent [19]
Korth

[11] Patent Number: 5,767,842
[45] Date of Patent: Jun. 16, 1998

[54] METHOD AND DEVICE FOR OPTICAL INPUT OF COMMANDS OR DATA

[75] Inventor: Hans-Erdmann Korth, Stuttgart, Germany

[73] Assignee: International Business Machines Corporation, Armond, N.Y.

[21] Appl. No.: 427,188

[22] Filed: Apr. 21, 1995

Related U.S. Application Data

[63] Continuation of Ser. No. 12,213, Feb. 2, 1993, abandoned.

[30] Foreign Application Priority Data

Feb. 7, 1992 [EP] European Pat. Off. ............ 92102049

[51] Int. Cl.[6] .................................................. G09G 5/00
[52] U.S. Cl. ............................................. 345/168; 345/173
[58] Field of Search .................................. 345/157, 158, 345/163, 168, 169, 173; 382/312, 313, 315

[56] References Cited

U.S. PATENT DOCUMENTS

| | | | |
|---|---|---|---|
| 3,510,210 | 5/1970 | Haney | 352/39 |
| 4,237,483 | 12/1980 | Clever | 358/108 |
| 4,672,559 | 6/1987 | Jansson et al. | 358/93 |
| 4,763,356 | 8/1988 | Day, Jr. et al. | 345/173 |
| 4,821,118 | 4/1989 | Lafreniere | 358/93 |
| 4,928,170 | 5/1990 | Soloveychilk et al. | 358/93 |
| 4,991,005 | 2/1991 | Smith | 358/93 |
| 5,025,314 | 6/1991 | Tang et al. | 358/93 |
| 5,168,531 | 12/1992 | Sigel | 340/709 |
| 5,239,373 | 8/1993 | Tang et al. | 340/706 |

Primary Examiner—Xiao Wu
Attorney, Agent, or Firm—Bernard D. Bogdon

[57] ABSTRACT

A method of user command or data acquisition in a processing system that allows for analysis of human hand and finger motions. The activities are then interpreted as operations on a physically non-existent input device. The resulting optical user/computer interface complements the visual screen-to-user path with a hand-to-image data acquisition link from the user to the processor unit. It allows for the emulation of different types of manually operated input devices (mouse, keyboard, etc.). Mechanical input units can be replaced by virtual devices, optimized for the current application and for the user's physiology. The speed, simplicity and avoidance of ambiguity of manual data input will be maintained. Sensing of finger motions can generate feedback to reduce the hazard of repetitive strain injury (RSI) syndrome.

10 Claims, 2 Drawing Sheets

METHOD AND DEVICE FOR OPTICAL INPUT OF COMMANDS OR DATA

This application is a continuation of application Ser. No. 08/012,213 filed Feb. 2, 1993, now abandoned.

BACKGROUND OF THE INVENTION

1. Field of the Invention

The present invention lies in the field of interfaces for direct data or command input by the human user. More specifically, the invention concerns devices which are operated manually and react on finger tip pressure or other hand induced motions.

2. Description of the Background Art

To enter data e.g. into a computer, the keyboard is the most widely used device. It allows fast, unambiguous input of digital data. Alternative input devices may be used for special, limited applications. Voice recognition is inherently fast, but requires a very large processing overhead. Ambiguity is inherent to the voice-to-text conversion. Automated hand-writing analysis is difficult, too. Input of easily readable single characters is slow and tedious. To read individual writing can be a complex and time consuming task.

Pointing devices (mouse, pen) have found widespread application in conjunction with graphical windowing environments to control the processing and to enter binary data. With this arrangement a typical computing session requires frequent switching between pointer and keyboard.

In CAD applications typically a mouse is used for editing graphics. Other devices, e.g. joysticks or trackballs can be added to the system to allow convenient entering of viewing commands, such as rotation of a virtual 3D-object for generating a drawing of another perspective.

A specific optical input device for use in a graphic station is described in IBM TDB Vol. 32, No. 3B, August 1989, p. 92. This device consists of a hand held cube whose faces are painted specifically to provide cues for surface orientation. Actual position and orientation of the cube is detected by a TV-sensor. The recorded picture of the cube is digitally processed and commands are extracted to change the graphic presentation of a virtual 3D-object in correspondance to the cube's orientation. There are remaining problems inherent in this technique as due to the fact that the cube is held by hand the orientation cues are partially obscured. With the ongoing trend to miniaturization advanced computers are characterized by reduced dimensions. While the size of the electronics is shrinking, the dimensions of the user interface, e.g. keyboard or mouse, cannot be reduced too much without a loss of functionality.

SUMMARY OF THE INVENTION

The present invention is intended to remedy the drawbacks inherent with the prior art user input devices.

It is therefore an object of the present invention to provide a new and advanced interface for data or command input in data or command processing systems which avoids problems inherent with mechanical components and allows for the emulation of various types of manually handled input devices.

This is achieved by the present invention as claimed, disclosing an optical user interface which in general is an arrangement using an image acquisition system to monitor the hand and finger motions and gestures of a human user. These activities are interpreted as operations on a physically non-existent computer keyboard or other input device. The image acquisition system comprises a TV-sensor and means for digitizing and processing signals from said TV-sensor. The Hand, including the fingers and finger-tips, of the user is observed by the TV-sensor and active motions are detected and analyzed by said means for processing signals and interpreted as respective input data or commands.

The required hardware for the inventive optical interface is a (e.g. a CCD-array) video sensor with 'frame grabbing' circuitry. A 100×100 pixel array should be the minimum for the required image processing. An anamorphotic imaging lens or a sensor chip with stretched pixels may be used to match the sensor with the aspect ratio of the keyboard. Autofocus or fixfocus will simplify the setup procedure. Standard sensors for camcorders or electrophotographic sensors easily fulfill these requirements.

Black and white imaging will be sufficient, if the desktop can be discriminated by a grey-level that differs significantly from the shade of human skin. If no assumptions can be made about the background (e.g. desk surface), some low-level image processing is required to determine the contours of the operator's hands. With the a priori knowledge that the background image remains constant (except for noise and shading) and the knowledge about the hand as a contiguous entity, only a moderate amount of time-critical processing will be necessary.

It should be noted that due to the lower part count, the costs for the camera and the frame-grabbing hardware can ultimately be lower than the cost for a good stand alone keyboard with driving circuitry. A further cost reduction arises from the fact, that some defective pixels (e.g. on the CCD-chip) can be tolerated.

A TV camera with 50 (half-) frames per second will be fast enough to monitor typing speeds of some 10 keys per second. While general image processing tasks require a large amount of computing power, keystroke detection can be done quite economically, since there is a lot of a priori knowledge involved.

If the camera is directed e.g. from a monitor or a computer housing towards the operator (FIG. 1), the lower part of the image is filled by the working desk. Objects moving over the desk can be identified as hands quite easily by their size, shape and motion. When a hand has been identified, its displacement within subsequent image frames will be rather small. Therefore, only a moderate number of pixels must be analyzed to keep track of the motion and to verify the integrity of the picture scene.

Given the shape of a hand over an imaginary keyboard, a simple model allows to attribute the finger-tip locations to the (up to five) protrusions on the lower side of the hand contour. The motions of the fingers relative to the hand are small too. They can be monitored efficiently by the evaluation of small image regions. The steadiness of the motions allows to extrapolate the locations of the search regions.

Obviously, in addition to the finger-tip motions the motions and the shape of the hands can be used to send gestures with additional information to the optical interface (e.g., begin/end of session, keyboard redefinition, camera mode, or other commands). Thus the invention realizes an advanced contactless data/command input device, capable to replace manually operated means in data processing systems or electronic compounts in general.

The optical user interface can be used for a multitude of tasks. They can be exchanged instantly and can be switched with the current application.

Alphanumeric keyboards: A striking advantage is offered by a virtual keyboard for 'sub-notebook' sized computers. A full-size keyboard is available with the compact device.

Keyboards for large character sets: The visualization of the actual key function allows the handling of keyboards with multiple shift keys and subgroup display for large character sets (e.g. Kanji characters).

Calculator panels: The layout can be optimized, e.g. for input speed, simplicity or an appropriate set of function keys.

Arbitrary analog and digital control panels: Different control panels, e.g. trackball, joystick can be emulated for the actual task.

Keyboards for musical instruments: Equipped with a virtual piano keyboard, a PC becomes a complete system for music production. External keyboards, synthesizers/sequencers will be obsolete. Impact dynamic sensitivity is inherent to the sensor algorithm. With camera and piano keyboard a PC will have a 'multi-media' interface allowing input, output, processing and storage of pictures and tunes.

Personal signature identification: A positive ID can be obtained from signature dynamics.

Alternative camera input: The image acquisition capability of the system can be used additionally for other purposes, e.g. document scanning, FAX, and picture-phone. The above and other objects and advantages of the invention are achieved, at least in part, by providing, in a data processing system, a method of data input using a video sensor for monitoring positions of an operator's hand with respect to keys on a keyboard or other control panel. The keys are hit with fingers of the operator's hand. The video sensor scans along an area adjacent to the keyboard to detect presence of the hand in the area. If the hand is detected, the video sensor follows the contour of the hand to detect positions of the fingers. Then, the video sensor scans along each of the fingers to determine locations of the finger's tips with respect to the keys. The identification information of the keys hit with the fingers is entered into the processing system as the data being input by the operator's hand.

In accordance with one aspect of the invention, to detect the keys, a hit produced by each finger of the operator at a key is detected by determining the speed of hitting the key. This procedure involves determining the speed of the finger before an impact on the key, during the impact, and after the impact. The key may be also detected as a location where the finger hitting the key stops.

In accordance with another aspect of the invention, the video sensor monitors the keyboard to detect a sequence of successive motions of each of the operator's fingers in the vertical direction to identify each of the fingers,. Based on this uninterrupted sequence of vertical motions, the keys hit with each of the fingers are detected. The identification information of the detected keys are entered into the data processing system to represent input data.

In accordance with the invention, the data input is carried out by a system comprising means for providing presentation of a keyboard having a plurality of keys. A video sensor is used for monitoring the keyboard to generate image data representing positions of an operator's hand with respect to the keys. The image data are supplied to a computer that generates input data representing identification information of the keys hit with the operator's hand. The presentation of the keyboard is adjusted in accordance with individual physiological parameters of an operator to increase speed of hitting the keys with the operator's hand.

For example, the keyboard presentation may be provided by a virtual keyboard generated optically on a surface of a table. The size of the keyboard presentation may be adjusted in accordance with the visual, tactile and motoric functions of the operator, or in accordance with the size of the operator's hand. A video monitor may be provided to display positions of the operator's hand with respect to the keys.

BRIEF DESCRIPTION OF THE DRAWINGS

For a better understanding of the present invention, together with further objects and advantages, as a preferred embodiment of the invention the use of the optical interface as a virtual keyboard is described in the following with reference to the accompanying drawings, in which.

DETAILED DESCRIPTION OF THE INVENTION

The task of a keyboard is to provide information about the available keys and their location, to sense the depression of keys by the operator and to produce some feedback when a key has been touched.

Figure 1:
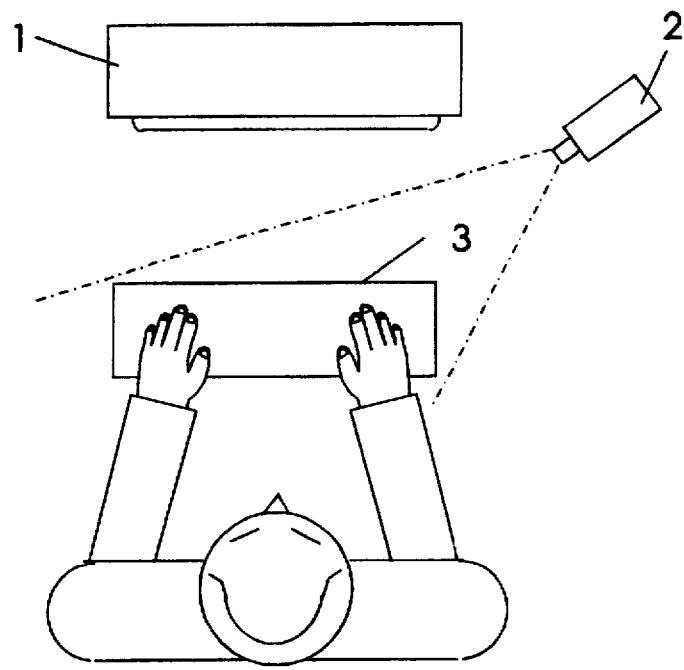
FIG. 1 shows the arrangement of the image aquisition system to detect the hand and finger motions of a human user.

The keyboard needs not to exist physically. In FIG. 1 a virtual keyboard 3 serves as data or command input device. From the computer side of the interface there need only be a way to detect the fingertip motions of the keyboard operator. Conventionally, this is done with electrical contacts below the individual keys. However, other approaches will work likewise. If the hand and finger movements on a virtual keyboard (e.g., a table-top) are monitored by an optical system, appropriate image processing can detect the user's intent.

Figure 2:
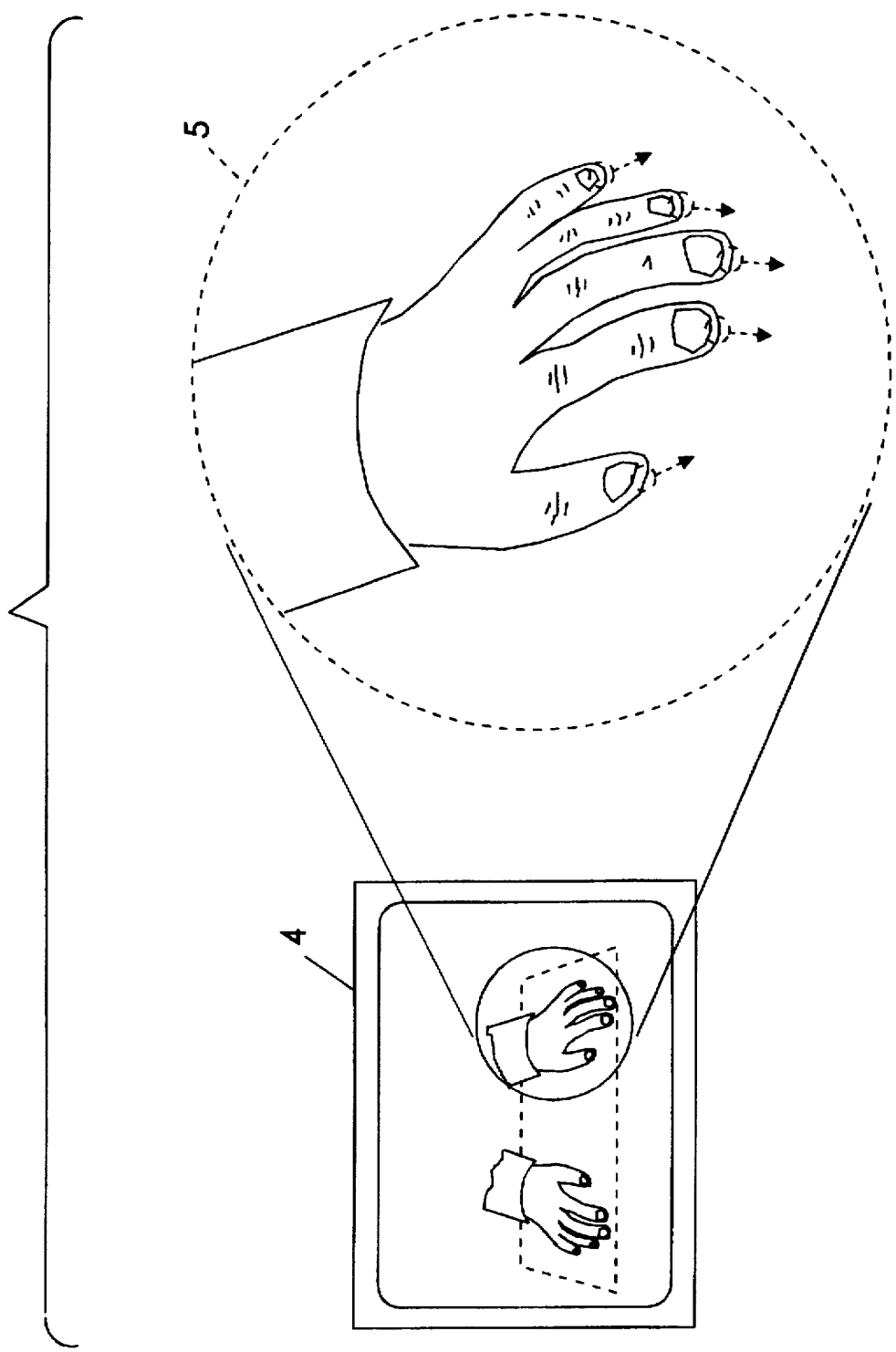
FIG. 2 is a schematic plot of the camera image together with an enhanced area segmentation of an observed hand.

FIG. 2 shows the area viewed by camera 2. In the observed region 4 the user's hands are detected. The enlarged section 5 of FIG. 2 represents an area of the camera's image which is chosen for further image processing.

Figure 3:
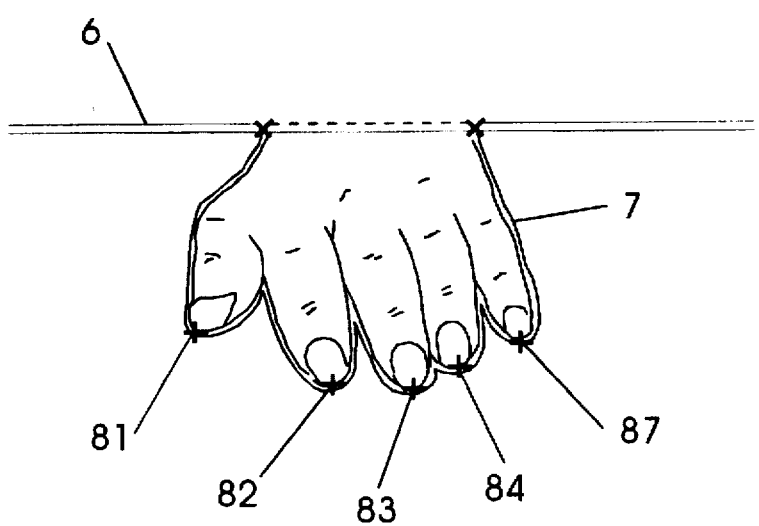
FIG. 3 demonstrates the steps of hand image processing.

A 3-level algorithm minimizes the execution time (FIG. 3). The 1st level algorithm scans contrast values along a line 6 to detect presence of a hand. The 2nd level routine follows the hand contour 7. The 3rd level algorithm finds the finger tip locations (81, 82, 83, 84, 85).

Key information for a virtual optical keyboard 3 (VOK) can be displayed in a window on the screen of the monitor 1. Schematic representations of the hand images can be displayed over a key template. The simultaneous display of the keyboard with the application will be advantageous for ergonomic reasons, since there is no need to switch the view between screen and keyboard.

The keyboard window may require some 10% to 20% of the display area. However, the window may appear only during the input of data, so that other simultaneous applications will not be affected. Checking the input cursor location, the keyboard window may position itself on the screen opposite to the text input area.

A finger-tip hitting a virtual key does a rapid movement downward (over a path of some 10 mm), stops abruptly when the desk surface is hit and moves back upward after a brief relaxation. The location where the hitting finger-tip stops can be attributed to a key. Ambiguities due to simultaneously moving fingers can be resolved evaluating the different motion characteristics (the hitting finger moves faster over a longer path and stops more abruptly) and by a hand model that indicates unlikely relative finger positions.

In practice, the finger tip position can be determined for every frame (or half-frame), i.e. about every 40 msec. A sequence of five frames accomplishes monitoring the tip motion for a 160 msec period. The tip location difference between two subsequent frames then gives four values for the finger speed (V4 ... V1). To identify a hit, a sequence of speed values has to be found that corresponds to the description above. To solve this problem with only four speed measurements some assumptions shall be made:

- Before the impact the finger tip acceleration will be relatively constant. This seems reasonable, because the acceleration depends only on the muscle tension. In this case, the speed (Vx) near the impact point can be calculated by extrapolation from the two pre-hit speed values. The extrapolated value can then be compared with a threshold value.
- The hit onto a virtual key implies, that the pre-hit speed values must be above a minimum value.
- On impact the speed decreases rapidly. Therefore, the speed measurement during the impact (V2) does not contain helpful information. It may be used, however, to check the validity of the measurement sequence (absence of noise).
- After the impact the finger tip speed decreases rapidly. The deceleration depends on elastic finger tip deformation. The post-hit speed must be within a range determined by the minimum deceleration and the maximum of the following reacceleration.

With these assumptions a set of four simple conditions can be written that must be fulfilled for a hit:

1. Vx>Vmin (Vmin=minimum impact speed)
2. V4>Vp (Vp=minimum pre-hit speed)
3. V2>V1 no oscillation
4. V1<Vt (Vt=maximum post-hit speed).

When a key hit has been detected, the corresponding key has to be found. This is not a trivial task, as the finger is moving. If the finger is guided visually, the key selection is done before the hit motion starts, i.e. some 100 msec before the hit detection. For fast typing under visual control, the 'search and hit' impulse of the human operator is generated from the visible distance between finger and the key to be hit. In this case, on the virtual kay board template that the actual impact point should be selected. In practice, a steady transition between these extremes must be implemented. Knowledge of the fingertip path allows for refining the prehit speed and acceleration criterion for the hit detection algorithm.

A self-centering routine is required to take over the tactile key center feedback provided by a physical keyboard: The human operator wants to hit the key enter. This allows an algorithm to reposition the finger image accordingly. To avoid an undesired drift of the hand image, a sort of 'stiffness' has to be implemented.

To monitor the finger tip dynamics, information about the vertical motion history of every finger tip is buffered. An uninterrupted sequence of five tip measurements is required to make a finger eligible for the hit determination algorithm. However, during the monitoring, the number of positively identified finger tips may change (e.g. due to poor illumination, fingers outside the video frame area or overlapping fingers). In this case the finger number assignment may change and the finger history will be corrupted. To avoid a dead-time of five frames for a new build-up of the history buffers, a reassignment algorithm is required. When the finger count is increased the new fingers must be identified. Pointers must be generated that allow the correct access to the history buffers. In case of a decreasing finger count, the pointers for the remaining fingers must be updated. With the virtual keyboard routines all fingers (except the newcomers) are tracked permanently. Even in case of noise induced finger-count fluctuations the fingers can be monitored for the hit signature.

A set of simple intuitive 'gestures' may be defined to control the operation of a virtual keyboard, e.g.:

Start/End: The image processing algorithm checks for the presence of a hand, scanning the 'wrist line'. This is done e.g. every 320 msec or when a hand contour detection error occurs. If a hand is detected the keyboard template window will be opened on the display screen. If the hands are removed the window will be closed.

Type-start position: The placement of a hand on the desk (i.e. a simultaneous five finger hit) can be interpreted as a command to place the virtual keyboard so that, for example, the left hand is atop the A-S-D-F-space keys.

Undo: A rapid upward finger motion after a key hit will be a simple signal to 'undo' the hit. Highly intuitive will be the monitoring of the thumbs. Unconsciously, the thumbs are driven upward by the surprised reaction on a typing error. The undo gesture simplifies the keyboard action: The suspension of the current work in order to find the back-space or the delete key can be avoided.

Mode switch: Various gestures of one or both hands can be envisioned to switch between different keyboard modes (e.g. typewriter, mouse, calculator, finger pen/paint, host session, piano). The immediate switching between typewriter and pointing device allows a faster cursor placement.

Instead at the desk plane, the virtual keyboard can be defined relative to the finger-tip positions. This means, that the key for each finger will be assigned before the key is actually hit. A short, rapid downward movement then selects the input key. Pre-hit key assignment offers some unique features for operator feedback:

The key assignment can be displayed on-screen (e.g. as color coding on a keyboard layout window).

Electronically supported and stabilized key assignments allows to help operators with handicaps of the hand and finger motion.

Enlarged or acoustical feedback can support visually impaired operators.

The actual key function (shift-state etc.) can be indicated.

A 'lift-off' finger motion can be detected. This will be a fast and highly intuitive way to undo typing errors.

The real finger-tip location relative to the key center can be monitored (color, click loudness and pitch).

The computer can dynamically adjust the center of the virtual keys with respect to the actual finger and hand locations. A nearly stationary finger will be 'placed' automatically atop the virtual key. From this location an experienced typist will find the other keys without visual control.

Operator guidance allows to issue warning or encouragement when special keys come into reach.

Pre-hit key assignment can provide for efficient operator feedback. The virtual keyboard technique may be used to generate standard size keyboards for 'sub-notebook' size computers. Other implementations will reduce the desk surface requirements for PCs, define remote and protected keyboards and are adaptable for visually and motorically impaired persons.

Image (hand shape) segmentation becomes very simple, if a color sensor can be used and the hands are moved atop of a monochrome (blue) desk template. However, black and white imaging should work equally well, if the desktop can be discriminated by a grey-level that differs significantly from the shade of human skin. If no assumptions can be made about the desk background, some low-level image processing is required to determine the contours of the operator's hands. With the a priori knowledge, that the background image remains constant (except for noise and shading) and the knowledge about the hand as a contiguous entity, only a moderate amount of time-critical processing will be necessary.

As mentioned above, a keyboard should provide the user with the key information and feedback. Tactile feedback of a virtual keyboard is given by the contact of the finger-tip with the working plate. Acoustic feedback (clicks) can be generated easily by the processing unit.

Key information for a virtual keyboard can be displayed in a window on the monitor screen. Schematic representations of the hand images can be displayed over a key template. The simultaneous display of the keyboard with the application will be advantageous for ergonomic reasons, since there is no need to switch the view between screen and keyboard (Note: This is quite similar to the use of a mouse pointer).

The sensing of the finger motions can be used to generate feedback information for the operator, if the finger-tip impact is unnecessarily high. This will permit reduction of the hazard of stress induced RSI (repetitive strain injury) syndrome. In any case, since there are no physical spring-loaded keys the virtual keyboard may be operated with reduced finger strain.

A virtual keyboard allows an individual optimization of the keyboard size. This is absolutely not trivial. The hand size of humans varies over a significant range. The standard keyboard size is a compromise. When the visual, tactile and motoric functions of the operator to keyboard interface are separated, these functions can be optimized for ease-of-use and as a consequence for operating speed.

In addition, a virtual keyboard can be duplicated or split easily into separate elements for the right and the left hand. This allows a highly relaxed working position (e.g., in a chair with arm rest). The implications for handicapped persons are obvious.

For operators with not so much expertise in computer usage and typing, a printed template (place-mat) with the keyboard layout will be useful. Another image evaluation procedure then helps the image processor to match the virtual keyboard with the template. The place-mat may be applied on a piece of soft tissue (e.g. polyurethane foam) to reduce the strain on the finger-tips from the impact on a rigid desk plate.

It is claimed:

1. In a data processing system, a method of data input using video sensors for monitoring positions of an operator's hand with respect to keys on a virtual keyboard optically produced on a surface and for subsequent and correlated data recognition by corresponding key locations on the keyboard to the monitored positions of the fingers of the operator's hand, comprising the steps of:

touching the keys with fingers of the operator's hand to input data;

scanning by the video sensors adjacent to the keyboard to detect presence of the hand;

following by the video sensors the contour of the detected present hand to detect positions of the fingers of the operator's hand;

scanning by the video sensors along each of the fingers for determining locations of the tips of the fingers with respect to the keyboard to determine identification information of the keys touched with the fingers;

optically detecting with the video sensors each touch of the keys on the keyboard by the fingers of the operator's hand wherein the step of optically detecting each touch comprises the step of determining speed of the finger in motion to touch the key of the keyboard as a three dimensional vector measurement along the X, Y and Z axes of motion of the finger;

entering the identification information of the keys touched with the fingers into the data processing system to represent the input data; and monitoring subsequent positions of the fingers of the operator's hand and comparing the input data corresponding to each subsequent monitored finger position to the identification information of the keys touched, and corresponding each monitored position of the fingers of the operator's hand with individual key locations on the keyboard.

2. The method of claim 1, wherein the step of determining speed comprises the step of determining speed of the finger before a touch impact on the key.

3. The method of claim 1, wherein the step of determining speed further comprises the step of determining speed of the finger during a touch impact on the key.

4. The method of claim 1, wherein the step of determining speed further comprises the step of determining speed of the finger after a touch impact on the key.

5. The method of claim 1, further comprising the step of identifying each respective key on the keyboard as a location where the finger of the operator's hand touching the respective key stops.

6. In a data processing system, a method of data input using video sensors for monitoring positions of an operator's hand with respect to keys on a virtual keyboard optically produced on a surface and for subsequent and correlated data recognition by corresponding key locations on the keyboard to the monitored positions of the fingers of the operator's hand, comprising the steps of:

touching the keys with fingers of the operator's hand to input data;

scanning by the video sensors adjacent to the keyboard to detect presence of the hand;

following by the video sensors the contour of the detected present hand to detect positions of the fingers of the operator's hand;

scanning by the video sensors along each of the fingers for determining locations of the tips of the fingers with respect to the keyboard to determine identification information of the keys touched with the fingers;

optically detecting with one of the video sensors each touch of the keys on the keyboard by the fingers of the operator's hand, wherein the step of optically detecting each touch of each key includes the step of determining speed of each finger in motion for touching each respective key of the keyboard and detecting each touch providing the speed before each respective touch impact of each respective key exceeds a predetermined minimum value, the speed during the touch impact of each respective key exceeds the speed after the touch impact, and the speed after the touch impact of each respective key is less than the speed before a next key touch impact on the keys of the keyboard with the operator's finger;

entering the identification information of the keys touched with the fingers into the data processing system to represent the input data; and monitoring subsequent positions of the fingers of the operator's hand and comparing the input data corresponding to each subsequent monitored finger position to the identification information of the keys touched, and corresponding each monitored position of the fingers of the operator's hand with individual key locations on the keyboard.

7. A data processing system for keyboard data input and positional data correlation corresponding to keys on the keyboard, comprising:

a virtual keyboard generated optically on a surface for providing a presentation of a keyboard having a plurality of keys for touching with fingers from a hand of an operator;

video sensors for monitoring the keyboard and the fingers of the operator's hand to generate image data representing positions in three dimensions of the fingers of the operator's hand with respect to the keyboard and the keys;

means for processing responsive to the image data for generating input data representing identification information of the keys touched with the fingers of the operator's hand; and positional data correlation means for detecting an occurrence when the video sensors monitor that one of the fingers of the operator's hand generates three dimensional image data corresponding to identification information of one of the respective touched keys of the keyboard.

8. A method of keyboard data input into a data processing system using a video sensor for determining vertical positions of an operator's fingers with respect to keys on a keyboard surface, comprising the steps of:

hitting the keys with the operator's fingers, monitoring the keyboard and the operator's fingers by the video sensor to detect a sequence of successive motions of each of the operator's fingers in the vertical direction from the keyboard surface with respect to each of the operator's fingers;

detecting the keys hit with each of the operator's fingers based on the sequence of successive motions and the vertical positions of each respective operator finger; and entering identification information of the detected keys of the keyboard into the data processing system to represent input data for correlation to subsequent hitting of the keys by the operator's fingers.

9. In a data processing system, a method of data input using video sensors for monitoring positions of an operator's hand with respect to keys on a virtual keyboard optically produced on a surface and for subsequent and correlated data recognition by corresponding key locations on the keyboard to the monitored positions of the fingers of the operator's hand, comprising the steps of:

touching the keys with fingers of the operator's hand to input data;

scanning by the video sensors adjacent to the keyboard to detect presence of the hand;

following by the video sensors the contour of the detected present hand to detect positions of the fingers of the operator's hand;

scanning by the video sensors along each of the fingers for determining locations of the tips of the fingers with respect to the keyboard to determine identification information of the keys touched with the fingers;

optically detecting with one of the video sensors each touch of the keys on the keyboard by the fingers of the operators hand, wherein the step of optically detecting each touch comprises the step of determining speed of the finger in motion to touch the key of the keyboard during a touch impact on the key which includes the step of measuring the dynamic impact of the finger at the time of the touch of the finger of the operator's hand to the keyboard surface;

entering the identification information of the keys touched with the fingers into the data processing system to represent the input data; and monitoring subsequent positions of the fingers of the operator's hand and comparing the input data corresponding to each subsequent monitored finger position to the identification information of the keys touched, and corresponding each monitored position of the fingers of the operator's hand with individual key locations on the keyboard.

10. The method as defined in claim 9, where the method of measuring the dynamic impact of the finger, measures pressure of the tip of the finger on the touched key of the keyboard.

* * * * *